United States Patent [19]

Boden et al.

[11] 4,378,335
[45] Mar. 29, 1983

[54] DEVICE FOR PRODUCING A SOLID-FORMING OR FOAMING FLOWABLE REACTION MIXTURE

[75] Inventors: Heinrich Boden; Johann Niggemann; Bernhard Rentz, all of Leverkusen; Reiner Raffel, Siegburg; Ferdinand Althausen, Neunkirchen-Seelscheid, all of Fed. Rep. of Germany

[73] Assignees: Bayer Aktiengesellschaft; Maschinenfabrik Hennecke GmbH, both of Leverkusen, Fed. Rep. of Germany

[21] Appl. No.: 180,080

[22] Filed: Aug. 21, 1980

[30] Foreign Application Priority Data

Aug. 24, 1979 [DE] Fed. Rep. of Germany ....... 2934350

[51] Int. Cl.³ .................. B01F 15/02; B01F 5/04; B01J 14/00
[52] U.S. Cl. .................................. 422/133; 137/563; 251/63; 251/285; 239/533.6; 239/584; 366/137; 366/159; 366/173; 422/111; 422/112

[58] Field of Search ............... 422/133, 111, 112, 234; 425/145, 146, 4 R; 264/40.1, DIG. 83; 251/285, 63; 137/606, 563; 366/159, 173, 177, 182, 136, 137; 239/533.1, 533.6, 533.8, 583, 584

[56] References Cited

U.S. PATENT DOCUMENTS

| 1,735,718 | 11/1929 | Attendu | 239/533.6 X |
|---|---|---|---|
| 3,788,337 | 1/1974 | Breer | 137/563 |
| 3,924,651 | 12/1975 | Hippel et al. | 137/563 X |
| 3,926,219 | 12/1975 | Ersfield | 425/4 R |
| 4,013,391 | 3/1977 | Boden et al. | 425/145 |
| 4,076,210 | 2/1978 | Spielvogel | 251/285 X |
| 4,105,045 | 8/1978 | Althausen et al. | 137/563 |
| 4,239,732 | 12/1980 | Schneider | 366/159 X |
| 4,255,858 | 5/1981 | Crum et al. | 422/133 X |

Primary Examiner—Michael S. Marcus
Attorney, Agent, or Firm—Gene Harsh; Joseph C. Gil; Richard A. Elder

[57] ABSTRACT

The invention relates to a method and a device for producing a solid-forming or foam-forming flowable reaction mixture by metered injection of flowable reaction components into a mixing zone from which the finished reaction mixture is discharged.

3 Claims, 2 Drawing Figures

DEVICE FOR PRODUCING A SOLID-FORMING OR FOAMING FLOWABLE REACTION MIXTURE

BACKGROUND OF THE INVENTION

Injection nozzles are known, both in the form of partially squeezable hole-type nozzles and in the form of annular gap nozzles. In the known gap nozzles, a needle, which is axially adjustable, is arranged concentrically in the nozzle housing, and, together with the concentric nozzle opening of the nozzle housing, defines a variable gap with respect to the injection mixing chamber. This gap can be altered by means of adjustable stops. The reaction components to be mixed flow from the nozzle opening or the annular gap into an injection mixing chamber in which they are mixed together. The energy required for injection mixing is substantially dependent on the rate of flow, the viscosity, the solubility and the metering ratio of the reaction components. In addition to the distance and the position of the injection nozzles relative to each other, the shape and, in particular, the cross-sectional area of the nozzle openings (or the cross-section of flow) have a great influence on the degree of mixing. The nozzle openings (or their cross-sectional areas) are adjusted manually depending upon the rate of flow and viscosity of the reaction components passing therethrough. Adjustment is usually carried out after a largely subjective judgment of the degree of mixing. Such adjustments can be conducted, for example, by axial adjustment and fixing of the nozzle needle.

It has proved helpful to use the hydraulic pressure which has built-up between the metering pump and injection nozzle as a measure of the mixing energy available for injection mixing purposes. The minimum pressure needed for mixing is dependent on the above-mentioned parameters. Such pressure normally lies between 50 and 150 bar, but can reach 350 bar or even more in some cases. Since deviations from the optimum operating pressure in the metering system impair the degree of mixing, a constant, securely adjusted metering rate and viscosity of the reaction components and also a constant, securely adjusted opening cross-sectional area of the associated injection nozzles are preferably adopted during injection mixing.

A significant disadvantage of this mode of operation is that it is not possible to effect significant change in the metered quantity of reaction components per unit time. This change may be desirable in order to adapt the metered quantity of the resulting multi-component reaction mixture optimally to the geometric conditions within the mold cavities during the mold filling process.

The object of the invention is to allow a significant change in the metered quantity of reaction components per unit time, adapted to the geometric conditions within the mold cavity, of multi-component reaction materials, which may be highly reactive, during a mold-filling process even when using injection mixers, without impairing the mixed product of the reaction mixture produced in the injection mixers.

DESCRIPTION OF THE INVENTION

Figure 1:
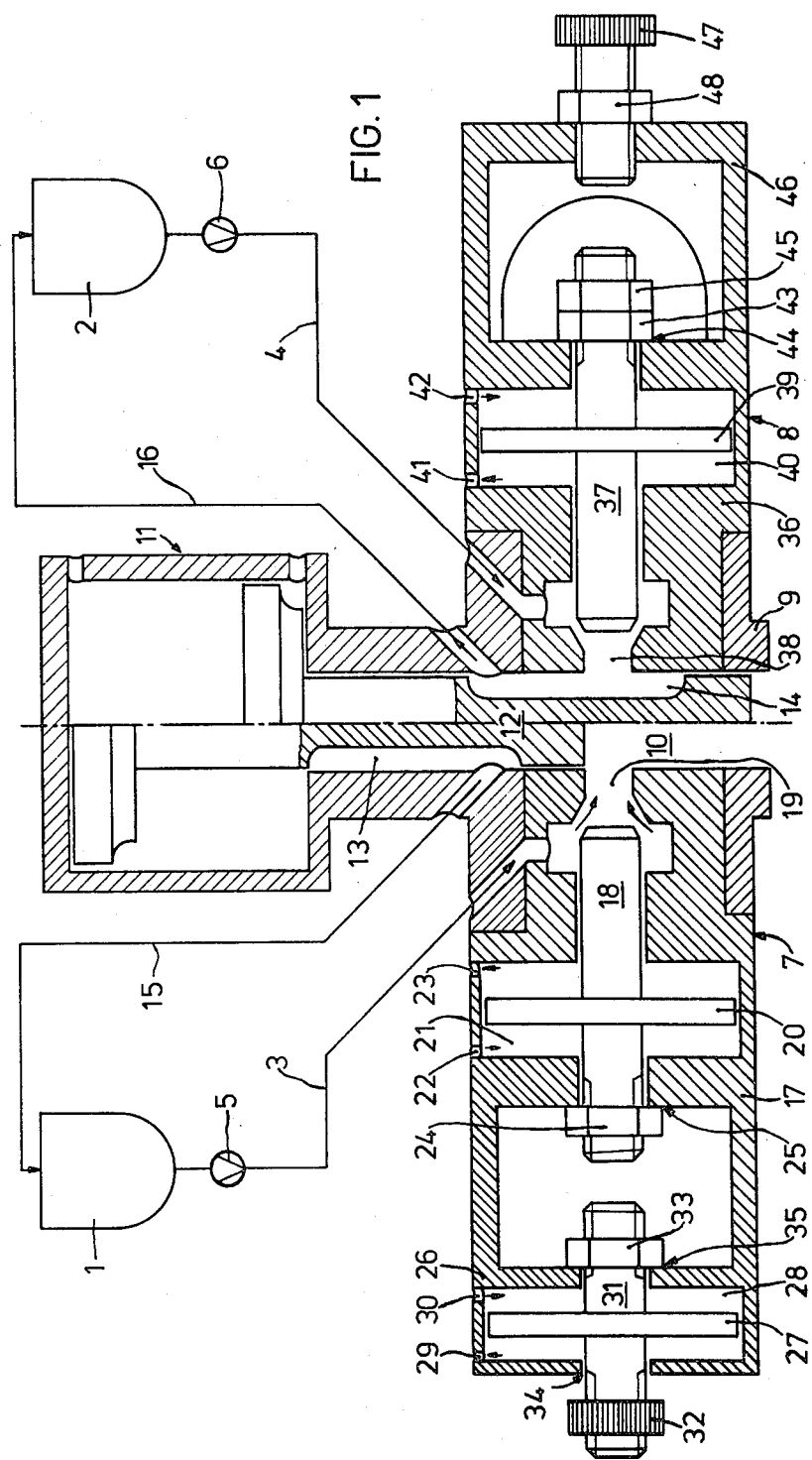
FIG. 1 shows an injection mixing device with manually adjustable injection nozzles and a control and ejection piston which controls advance and return.

The above objects are achieved according to the instant invention by:
(a) altering the metered quantity of reaction components per unit time during the injection process, and
(b) altering the cross-sections of injection into the mixing zone synchronously with the change in the metering rate.

This expedient permits the process of charging the flowable reaction mixture into the mold cavity to be adapted sufficiently carefully to make it possible to avoid the occurrence of serious defects involving air inclusions, which lead to undesirable bubble formation. The invention thus allows, for the first time, the introduction of the reaction mixture to be optimized over the duration of the filling time during injection mixing by a continuous method. The entry speed of the components into the mixing zone is preferably kept constant. Constant mixing conditions are thus also achieved.

The device of the invention comprises storage containers, from which feed pipes lead, via metering pumps whose metering capacity is adjustable, to a mixer head and merge via injection nozzles into a mixing chamber, the mixing chamber having an outlet opening. The novelty lies in the fact that:
(a) the injection nozzles have axially movable nozzle needles and in that
(b) each nozzle needle is provided with at least two adjustable stroke-limiting stops.

Each predetermined position of the stops corresponds to a specific position of the nozzle needle at the moment it rests against the stop and thus characterizes a specific opening cross-section of the nozzle corresponding to a previously determined metering rate. This allows the corresponding position of the nozzle needles to be adjusted by the predetermined stops. The desired opening cross-sections of the nozzles are thus controlled. The stops can be, for example, manually adjustable. Necessarily they may have to be adjusted during the mixing process.

In a preferred embodiment of the device, a control instrument is used. This instrument has pulse carrying lines for adjusting the output of the metering pump, the lines leading to the drive means thereof and to servomotors in order to actuate control valves for controlling an ejection piston, the injection nozzle and the stops. The feeding of a program into the control instrument allows the mixing process to be controlled and adjusted as desired. An optimized program can thus be introduced for each reaction system.

The control is effected as a function of the metered quantity of reaction components per unit time, for example, by means of the stroke speed or number of strokes of the associated metering pump or as a function of the hydraulic pressure in the metering system. The ability to control and adjust the process to differing molds is possible due to the adjustability of the stops, preferably by means of servomotors. Such measures are particularly advantageous in the mass-production of molded articles of differing size and geometry on one production line.

The invention allows at least two injection nozzles for at least two reaction components to be operated synchronously. The invention also allows a single injection nozzle to be reversed thereby changing the metering rate of only one of the reaction components. In the first case, it is also possible to carry out a synchronous change in the metering rate of all reaction components while keeping the metering ratio constant between the reaction components. Perfectly mixed products result. For example, during the mold filling process and, more specifically while changing the metering rate, a maximum change down to about 20% of a predetermined maximum metering rate is possible.

In the second case, the method allows the controlled alteration of the metering ratio, for example, of polyurethane reaction components relative to each other during one shot. This shift in the "index number" allows a change in the properties to be achieved within a molded article. The invention can be applied to devices whose mixer head has a control and/or cleaning piston as well as to devices whose mixer head is provided with injection nozzles which control the return flow.

Both the structural design of the stops and the control thereof gives the routineer the choice of many different embodiments.

The device according to the invention is illustrated schematically by two embodiments and is described in more detail below.

In FIG. 1, the device comprises storage containers 1,2. Feed pipes, 3,4, in which metering pumps 5,6 are placed, lead from the containers to injection nozzles 7,8 which merge into a mixing chamber 10 arranged in a mixer head housing 9. A control and ejection piston 12 which can be actuated by means of a hydraulic drive means 11 and which has circular guide grooves 13,14 is guided in the mixing chamber 10. The ejection piston 12 is shown in the mixing position in its left-hand half and in the ejection position in its right-hand half. In the ejection position, the circular guide grooves 13,14 are connected via return pipes 15,16 to the storage containers 1,2.

The injection nozzle 7 for the first component comprises the nozzle housing 17, the nozzle needle 18 and the nozzle opening 19 as well as the hydraulic drive means. The hydraulic drive means consists of a piston 20 which can be charged on both sides and is connected to the nozzle 18, and the hydraulic chamber 21, in addition to feed pipes 22,23. The nozzle needle 18 is provided at its downstream end with an adjusting nut acting as a stop 24, by means of which it is possible to adjust the minimum cross-section of flow to the nozzle opening 19. The adjusting nut 24 lies against the housing edge 25 in the position shown. The nozzle housing 17 is widened to an extension 26 in which a hydraulic unit consisting of piston 27 and cylinder 28 is arranged. The feed pipes are designated by 29,30. The piston rod 31 is guided outwards on both sides by the extension 26 and bears adjusting nuts acting as adjustable stops 32,33 at both ends. The adjusting nuts strike the housing edges 34,35. The adjusting nut 32 serves to define the middle position of the nozzle needle 18 with an associated middle cross-section of flow with charging of the piston 27 via the feed pipe 29 and the piston 20 via the feed pipe 23. The maximum stroke, adjusted by means of the adjusting nut 33, with the largest opening cross-section is achieved by charging the piston 20 also via the feed pipe 23, but the piston 27 via the feed pipe 30. The injection nozzle 7 is thus provided with three stops 24, 32, 33.

The injection nozzle 8 for the second component is constructed in a different manner only in order to illustrate an alternative possible embodiment. It comprises the nozzle housing 36, the nozzle needle 37 and the nozzle opening 38 as well as the hydraulic drive means consisting of a piston 39 (which is connected to the nozzle needle 37 and can be charged on both sides), and the hydraulic chamber 40 in addition to feed pipes 41, 42. The nozzle needle 37 is provided at its downstream end with an adjusting nut acting as a stop 43 with which the minimum cross-section of flow to the nozzle opening 38 can be adjusted. The stop nut 43 strikes against housing edge 44 in the illustration. The nut 45 serves to secure the adjusting nut 43. The stop nut 43 determines the minimum cross-section of flow. An adjusting screw with counter nut 48 is held coaxially as stop 47 in an extension 46 of the nozzle housing 36. The desired maximum entry cross-section can be adjusted by means thereof.

The hydraulic piston 27 should be provided with a larger area relative to the pressure area of the piston 20 at the same hydraulic control pressure for all control processes on the injection nozzle. Alternatively, it should be charged with a higher pressure than the piston 20 so that the nozzle needle 18 can be held in the central position.

Figure 2:
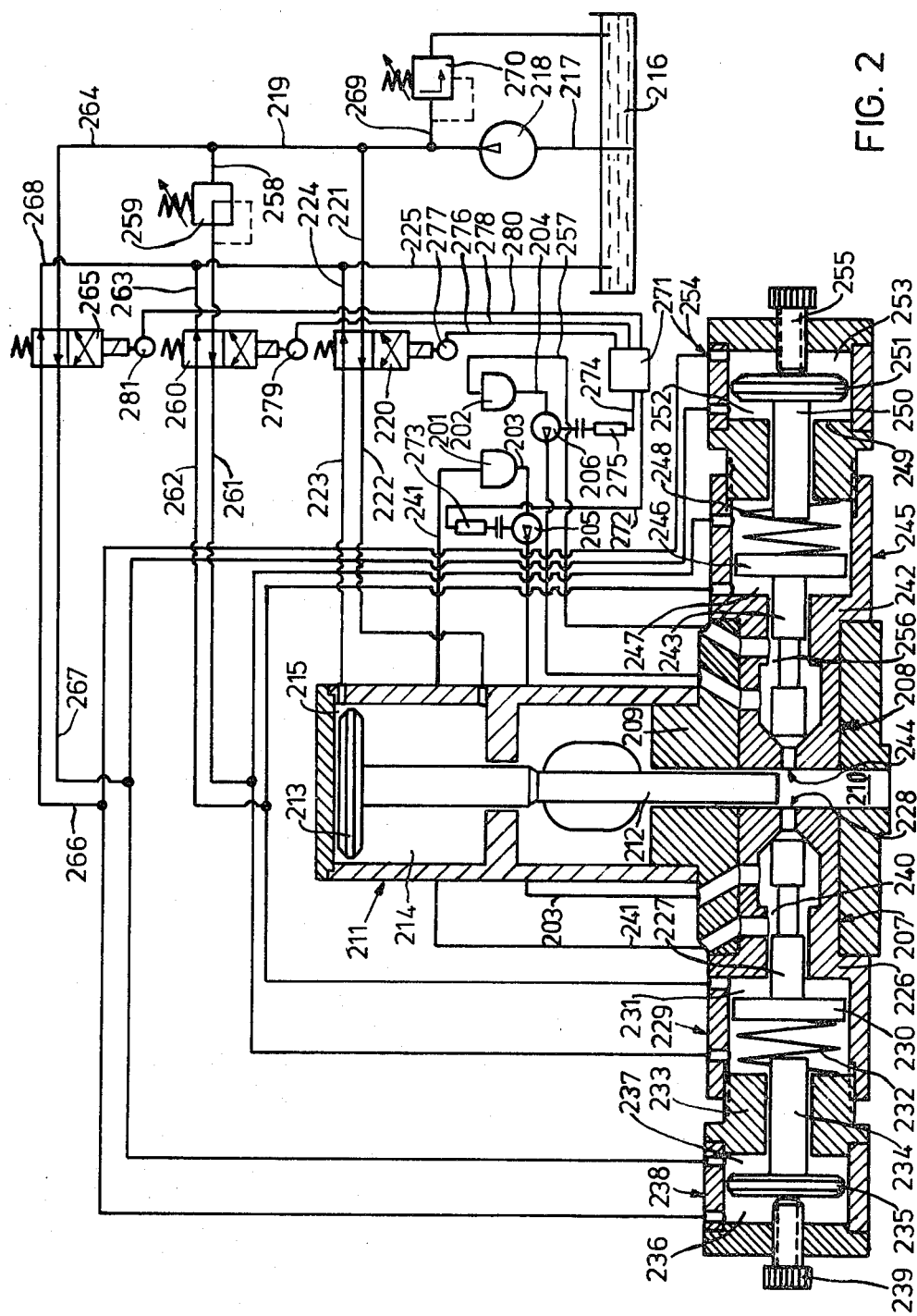
FIG. 2 shows an injection mixing device with hydraulically actuatable injection nozzles in which the advance and return are controlled by means of the injection nozzles.

In FIG. 2, the device consists of storage containers 201,202. Feed pipes 203,204, in which metering pumps 205,206 are placed, lead from them to injection nozzles 207,208 which merge into a mixing chamber 210 arranged in a mixer head housing 209. An ejection piston 212 which can be moved by means of a hydraulic drive means 211 is guided in the mixing chamber 210.

The hydraulic drive means 211 has a hydraulic piston 213 which can be charged on both sides at its other end, a hyraulic chamber 214,215 being located on each side. A suction pipe 217 leads from a hydraulic fluid reservoir 216 to a hydraulic pump 218 from which a pressure pipe 219 continues. A control valve 220 is connected to the pump 218 via a pipe 221. The control valve 220 is connected in such a way that the pipe 221 communicates via a pipe 222 with the hydraulic chamber 214. A pipe 223 leads from the chamber 215 to the valve 220. A pipe 224 leads from the valve 220 to the return pipe 225 which merges into the reservoir 216. In the other position (not shown) of the control valve 220, the pipe 221 communicates with the pipe 223 and the pipe 222 with the pipe 224 in order to charge the chamber 215 so that the contents of the mixing chamber 210 are ejected by advance of the ejection piston 212.

The injection nozzle 207 for the first component comprises the nozzle housing 226, the nozzle needle 227 and the nozzle opening 228 as well as the hydraulic drive means 229 consisting of a piston 230 (which communicates with the nozzle needle 227 and can be charged on both sides), and hydraulic chambers 231,232 (being arranged on both sides thereof).

The nozzle housing 226 has a coaxial adjustable screw 233 in which is guided, coaxially to the nozzle needle 227, a stop 234 which is designed as a needle and whose downstream end has a hydraulic piston 235 which can be charged on both sides and forms, together with the hydraulic chambers 236,237, the hydraulic drive means 238. The minimum stroke of the nozzle needle 227 is set by adjusting the screw 233. The maximum stroke of the nozzle needle 227 can be adjusted by means of another adjusting screw 239.

The component supplied via the pipe 203 is circulated via the annular space 240 provided between the nozzle needle 227 and the nozzle housing 226 into the return pipe 241 which merges into the storage container 201. By reversing the nozzle needle 227 by means of the hydraulic drive 229, the nozzle needle 227 travels against the stop 234, seals the annular chamber 240 and thus releases the nozzle opening 228 so that the component can flow into the mixing chamber 210.

The injection nozzle 208 for the second component is constructed in a similar manner and comprises the nozzle housing 242, the nozzle needle 243 and the nozzle opening 244 as well as the hydraulic drive means 245. The hydraulic drive means consists of a piston 246 (which communicates with the nozzle needle 243 and can be charged on both sides), and hydraulic chambers 247,248 (being arranged on both sides thereof). The nozzle housing 242 has an adjustable screw 249 in which a stop needle 250 is guided coaxially to the nozzle needle 243. The rear end of the stop needle 250 carries a hydraulic piston 251 which can be charged on both sides, and which together with the hydraulic chambers 252, 253, forms the hydraulic drive means 254. The minimum stroke of the nozzle needle 243 is set by adjusting the screw 249. The maximum stroke of the nozzle needle 243 can be set by means of another adjusting screw 255. The component supplied through the pipe 204 is circulated via the annular chamber 256 provided between the nozzle needle 243 and the nozzle housing 242 into the return pipe 257 which merges into the storage container 202. By reversal of the nozzle needle 243 by means of the hydraulic drive means 245, the nozzle needle 243 travels towards the stop 250, seals the annular chamber 256 and thus clears the nozzle opening 244 so that the component can enter the mixing chamber.

A pipe 258 containing a pressure-reducing valve 259 branches from the pressure pipe 219 and leads to a control valve 260. A branching pipe 261 leads from it to the hydraulic chambers 232,248. A combining pipe 262 leads from the hydraulic chambers 231,247 to a control valve 260. The control valve is connected via a pipe 263 to the return pipe 225. If the hydraulic chambers 231,247 are to be charged, so as to reverse the nozzle needles 227,243, then the control valve 260 switches the pipe 258 together with the pipe 262 and simultaneously connects the pipe 261 to the pipe 263.

Finally, an additional branch pipe 264 leads from the pressure pipe 219 to a control valve 265. A branching pipe 266 leads from it to the hydraulic chambers 236,253. A combining pipe 267 leads from the hydraulic chambers 237,252 to the control valve 265, from which a branch pipe 268 leads to the return pipe 225. If the hydraulic chambers 236,253 are to be charged, in order to allow the minimum position of the nozzle needles 227,243, then the control valve 265 connects the pipe 264 to the pipe 266, and the pipe 267 to the pipe 268 by switching over. An overflow pipe 269 in which an adjustable pressure overflow valve 270 is arranged leads back into the reservoir 216.

The control valve 220 consequently actuates the ejection piston 212. The control valve 260 actuates the nozzle needles 227,243 of the forced control injection nozzles 207,208 to "circulate" and to "mix". Finally, the control valve 265 actuates the stop needles 234,250 to adjust the desired stroke width of the nozzle needles 227,243. The screws 233,249 are held adjustably in the nozzle housings 226,242 by means of a screw thread (not numbered) so that the stroke width of the nozzle needles 234,243 can be adjusted for the minimum position.

A control instrument 271 allows a program to be preset. Accordingly, pulses will be emitted at desired moments by means of time clocks contained in the control instrument 271. Pulses are transmitted from the control instrument via the pulse line 272 to the drive means 273 of the metering pump 205, via the pulse line 274 to the drive means 275 of the metering pump 206, via the pulse line 276 to the servomotor 277 of the control valve 220, via the pulse line 278 to the servomotor 279 of the control valve 260, and via the pulse line 280 to the servomotor 281 of the control valve 265.

What is claimed is:

1. A device for producing a solid-forming or foam-forming reaction mixture comprising storage containers from which feed pipes lead via metering pumps of adjustable output to a mixer head housing and merge in said housing via impingement nozzle openings within said housing into a mixing chamber, the mixing chamber having an outlet opening, characterized in that
    (a) axially hydraulically movable nozzle needles are concentrically mounted in longitudinal bores within said housing and are adapted to vary the cross-sectional area of said nozzle openings and in that
    (b) hydraulic drive means within said housing to move each nozzle needle, said hydraulic means located opposite to the nozzle openings and being provided with at least two mechanically adjustable stroke-limiting stops, said stops located along the stroke of the hydraulic drive means, at least one of the stops being located within said housing.

2. A device according to claim 1, characterized in that a control instrument is provided whose pulse-carrying lines for adjusting the output of the metering pumps lead to their drive means and to servomotors to actuate control valves for controlling (i) an ejection piston which is mounted to guide through the mixing chamber, (ii) the impingement nozzle needles and (iii) certain of the internally located, mechanically adjustable stroke-limiting stops provided for the nozzle needles.

3. A device according to claim 1, characterized in that said axially hydraulically-movable nozzle needles are adapted to sealingly engage said nozzle openings.

* * * * *